US008401773B2

(12) United States Patent
Eagles et al.

(10) Patent No.: US 8,401,773 B2
(45) Date of Patent: Mar. 19, 2013

(54) AIR TRAFFIC CONTROL

(75) Inventors: Robert Eagles, Montreal (CA); Jenny Weston, Hampshire (GB); William Casey, Hampshire (GB); Martin Southall, Hampshire (GB)

(73) Assignee: Nats (En Route) Public Limited Company, London (GB)

( * ) Notice: Subject to any disclaimer, the term of this patent is extended or adjusted under 35 U.S.C. 154(b) by 757 days.

(21) Appl. No.: 12/306,914

(22) PCT Filed: Jun. 29, 2007

(86) PCT No.: PCT/GB2007/002449

§ 371 (c)(1),
(2), (4) Date: Oct. 23, 2009

(87) PCT Pub. No.: WO2008/001117

PCT Pub. Date: Jan. 3, 2008

(65) Prior Publication Data

US 2010/0049430 A1 Feb. 25, 2010

(30) Foreign Application Priority Data

Jun. 30, 2006 (GB) .................................. 0613055.3

(51) Int. Cl.
*G06F 19/00* (2011.01)

(52) U.S. Cl. .............. 701/120; 701/3; 701/400; 342/29; 342/36; 342/175; 244/75.1; 340/945; 340/970

(58) Field of Classification Search .................. 701/120; 342/36; 340/975; 244/75.1
See application file for complete search history.

(56) References Cited

U.S. PATENT DOCUMENTS 4,480,226 A * 10/1984 Kuno et al. .................. 324/247
4,949,267 A 8/1990 Gerstenfeld et al.
5,273,486 A * 12/1993 Emmons et al. ................ 454/74
5,714,948 A 2/1998 Farmakis et al.

(Continued)

FOREIGN PATENT DOCUMENTS

EP 0380460 A2 8/1990
EP 0598154 A1 5/1994

(Continued)

OTHER PUBLICATIONS

International Search Report and Written Opinion from GB2006/004850.

(Continued)

*Primary Examiner* — Redhwan K Mawari
(74) *Attorney, Agent, or Firm* — Procopio, Cory, Hargreaves & Savitch LLP

(57) ABSTRACT

An air traffic control system, for use by a human controller controlling a plurality of aircraft held vertically separated in a stack above a minimum stack level, the system comprising at least one processor, and a display device for the human controller, controlled by said at least one processor; further comprising: means for periodically inputting a value representative of local terrestrial air pressure conditions; means for periodically inputting an aircraft flight level reading representing an altitude defined by a reference air pressure measured on the aircraft; means for periodically generating a display on said display device comprising a plurality of flight levels vertically arranged; means for indicating in said display said plurality of aircraft, arranged in a vertical list ranked by flight level; said at least one processor being arranged, on reception of a new said value, to redetermine said minimum stack level and to vary said display so as to indicate changes to said minimum stack level.

16 Claims, 7 Drawing Sheets

U.S. PATENT DOCUMENTS

| | | | |
|---|---|---|---|
| 6,393,358 B1 | 5/2002 | Erzberger et al. | |
| 6,604,044 B1 | 8/2003 | Kirk | |
| 6,785,594 B1 * | 8/2004 | Bateman et al. | 701/9 |
| 2003/0200024 A1 | 10/2003 | Poreda | |
| 2005/0035898 A1 * | 2/2005 | Shiomi et al. | 342/36 |
| 2007/0032940 A1 | 2/2007 | Villiers | |

FOREIGN PATENT DOCUMENTS

| | | | |
|---|---|---|---|
| EP | 1450331 | A1 | 8/2004 |
| FR | 2854978 | A1 | 11/2004 |
| WO | WO8801086 | A2 | 2/1988 |
| WO | WO03067545 | A1 | 8/2003 |
| WO | WO2004102505 | A2 | 11/2007 |

OTHER PUBLICATIONS

P. Whysall: Future Area Control Tools Support (FACTS), 2nd USA/Europe Air Traffic Management R&D Seminar, Dec. 1998, pp. 1-10, XP002423982, Orlando, FL.

A. Price: Future Area Control Tools Support Operational Concept and Development Status, FAA/EURO Control AP6 TIM, Oct. 1999, pp. 109, XP002423983, Memphis, USA.

International Search Report and Written Opinion for PCT/GB2006/004873.

ATC Training: NATS Looks to the Future, article published sometime before Nov. 10, 2005, available at the following URL: http://www.airport-int.com/categories/atc-training/atc-training-nats-looks-to-future.asp.

International Search Report and Written Opinion from PCT/GB2007/002459 issued Sep. 20, 2007.

International Search Report and Written Opinion from PCT/GB2007/002449 issued Sep. 20, 2007.

Civil Aviation Authority, Safety Regulation Group. "CAP 493, Manual of Air Traffic Services Part 1." Jul. 2, 2009. Published by TSO (The Stationery Office) on behalf of the UK Civil Aviation Authority. 10 pages.

European Organisation for the Safety of Air Navigation. Eurocontrol Experimental Centre. "Attitudes to Change in ATM Operations Introduction of CDA Trials at Manchester, Bucharest & Stockholm." Final Report. EEC Note No. 08/07. Issued Nov. 2007, 3 pages.

Kershaw et al. "The influence of ATC in approach noise abatement." 3rd USA/Europe Air Traffic Management R&D Seminar, Napoli. Jun. 13-16, 2000. 8 pages.

* cited by examiner

AIR TRAFFIC CONTROL

This invention relates to computerised systems for aiding air traffic control, and particularly to systems providing user interfaces for assisting controllers to visualise and control aircraft in a vertical stack.

Air traffic control involves human staff communicating with the pilots of a plurality of aircraft, instructing them on routes so as to avoid collisions. Aircraft generally file "flight plans" indicating their routes before flying, and from these, the controllers have some initial information on the likely presence of aircraft, but flight plans are inherently subject to variation (due, for example, to delays in take offs; changes of speed due to head wind or tails wind; and permitted modifications of the course by the pilot). In busy sectors (typically, those close to airports) active control of the aircraft by the controllers is necessary.

The controllers are supplied with data on the position of the aircraft (from radar units) and ask for information such as altitude, heading and speed. They instruct the pilots by radio to maintain their headings, alter their headings, in a predetermined fashion, or maintain or alter their altitudes (for example to climb to a certain altitude or to descend to a certain altitude) so as to maintain safe minimum separation between aircraft and, thus, to avoid the risk of collisions. Collisions are extremely rare, even in the busiest areas, due to the continual monitoring and control of aircraft by the air traffic controllers, for whom safety is, necessarily, the most important criterion.

On the other hand, with continual growth of air transportation, due to increasing globalised trade, it is important to maximize the throughput of aircraft (to the extent that this is compatible with safety). Further increasing throughput with existing air traffic control systems is increasingly difficult. It is difficult for air traffic controllers to monitor the positions and headings of too many aircraft at one time on conventional equipment, and human controllers necessarily err on the side of caution in separating aircraft.

Aircraft generally measure their altitude using a pressure (or barometric) altimeter. The barometric pressure drops approximately 1 millibar for every 28 feet (8.4 metres) of ascent. Thus, if a reference pressure at some reference altitude is known, an aircraft can calculate its height above that reference altitude by determining the pressure drop between the pressure measured by the aircraft and the reference pressure.

The air pressure at any place varies over time, and the air pressure varies from one place to another. Accordingly, the pressure reading taken by an aircraft cannot unambiguously be converted into an altitude reading without knowing the current local reference pressure (at a reference altitude).

For aircraft in transit, it is conventional to refer to "flight levels" rather than altitudes. A flight level corresponds to the altitude (expressed in units of hundreds of feet) above sea level which the aircraft would occupy, on the basis of its altimeter reading, relative to a reference pressure of 1013 millibars. If the instant pressure at sea level happens to be 1013 millibars, then the flight level corresponds to the actual altitude. Flight levels therefore form concentric isobaric surfaces spaced from one each another like the layers of an onion, and a flight controller can separate aircraft in one area by specifying that they occupy different flight levels.

On the other hand, aircraft which are descending or ascending need to know their actual altitude or height relative to the local surface, and therefore need to take into account current the local barometric pressure. Such aircraft are therefore supplied, from the ground, with a local reference pressure measurement. This may be the pressure at ground level, or the pressure at sea level. Both are used in different applications, but the pressure at ground level (referred to as a "QNH" measurement) is widely used for civil aircraft. In London, where there are several international civil airports, the average of the current pressures at the different airports is supplied as the QNH measurement for all the airports.

As an aircraft climbs though a transition altitude after takeoff, the aircrew change the reference setting of the altimeter from the local QNH setting to the standard 1013 mbar setting, and thereafter operate by reference to flight levels rather than to local altitude. Likewise, on descending, at a transition altitude the crew of the aircraft alter their reference pressure setting of their altimeter from 1013 to the local QNH, which is broadcast on a local radio channel. Thereafter, the aircraft reports, and operates on the basis of, the local altitude rather than the flight level.

One tool used for air traffic control is a vertical stack. At busy airports, it may be necessary to hold an aircraft temporarily before it can land. An area of airspace close to the airport may therefore be designated as a stack. The air traffic controller has, at any time, a number of aircraft in the stack of which some are in a holding pattern, others are entering the air space, and other are exiting the air space. Additionally, some aircraft will be instructed to descend from the stack to land. For those aircraft held in the stack prior to landing, the air traffic controller will usually "ladder" the aircraft down; that is, instruct the lowest in the stack to land, then descend the remaining aircraft within the stack to occupy the unoccupied levels (in a first-in first-out arrangement like a pipeline).

In a vertical stack, aircraft are typically kept well separated by allocating each a different flight level. Standard procedures require a separation of 1000 feet between aircraft in a stack. The fact that two aircraft occupy the same flight level does not necessarily mean that they will come close to each other, since they may be separated laterally (i.e. in azimuth). Nonetheless, vertical separation, where possible, leads to greater safety and requires less active management by the air traffic controller.

Conventionally, in the past, air traffic controllers have utilised paper slips, each representing an aircraft, which can be arranged in an ordered list as a tool to manage aircraft. More recently, the present applicant has introduced display tools for creating a computer display on a controller's workstation which in some respects automate the paper slips, by displaying in a vertical stack a list of the aircrafts which an air traffic controller is controlling.

In addition to aircraft which are added to the stack because they are awaiting landing, the controller needs to be aware of any other aircraft in the vicinity, or which might enter the vicinity. The present applicant has provided a "vertical stack list" program which detects the horizontal (i.e. azimuthal) position of aircraft and adds them to a stack associated with an airport when they are within a predetermined volume of airspace and where their flight plans indicate that airport as their destination. The controller may also manually add an aircraft to the vertical stack list where, for example, he thinks it may in future enter the predetermined volume. The stack list is displayed in height order.

Radar monitoring of aircraft has recently been improved with the introduction of so called "Mode S" (short for Secondary Surveillance Radar (SSR) Mode Select), as described at www.caa.co.uk/default.aspx?categoryid=810

A Mode S radar includes an interrogator, and each Mode S-equipped aircraft includes a transponder. When the interrogator interrogates a particular aircraft, its transponder transmits a number of data in reply. These include pressure altimeter readings (accurate down to a minimum increment of 100 feet, or in some cases 25 feet, provided the altimeter reference altitude is correctly set). It is thus possible to obtain selectively, from each aircraft, a current set of instrument readings, free from possible crew reporting errors, more accurately than by the use of radar alone. Each aircraft can therefore be indicated at the altitude corresponding to its measured altitude or flight level, rather than to that reported by the aircrew.

It is desirable to separate the bottom of the stack from the lower altitudes through which aircraft are ascending or descending to an airport, and thus it is normal practice to set the bottom of the stack at least 1000 feet above the transition altitude (at which aircraft switch between flight levels and QNH altitude readings).

An aim of the present invention is therefore to provide computerised support systems for air traffic control of vertical aircraft stacks which allow human operators to increase the throughput of aircraft without an increase in the risk of losses of minimum permitted separation from its present very low level. The invention in various aspects is defined in the claims appended hereto, with advantages and preferred features which will be apparent from the following description and drawings.

Embodiments of the invention will now be illustrated, by way of example only, with reference to the accompanying drawings in which.

Figure 4:
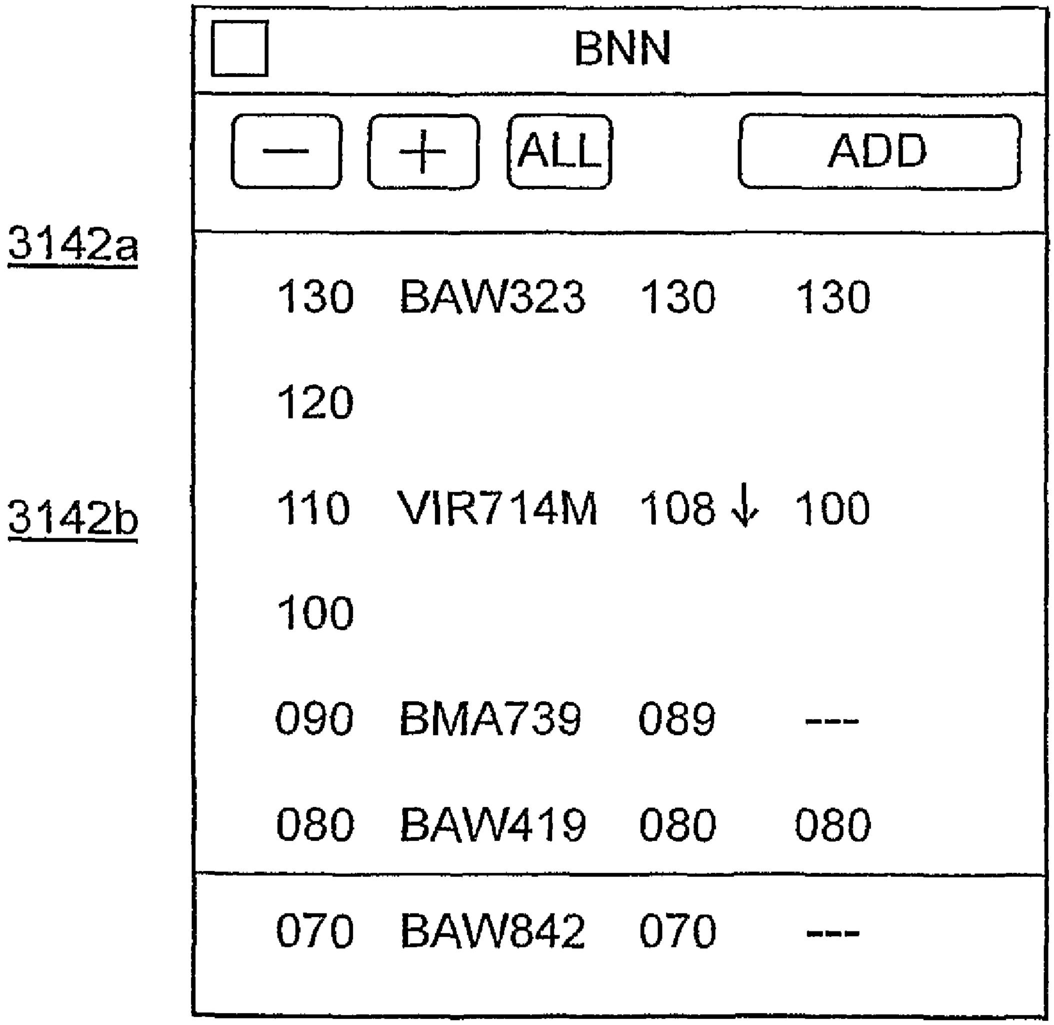
FIG. 4 is a screen display produced according to a preferred embodiment.
Figure 7A:
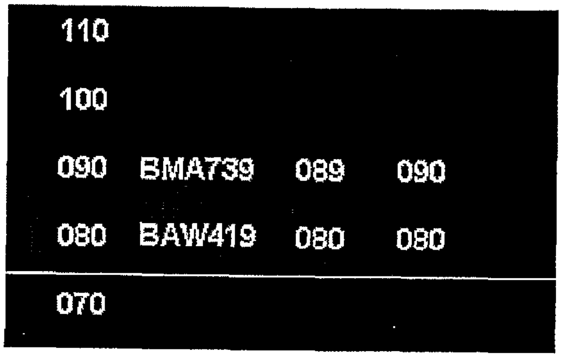
Figure 7B:
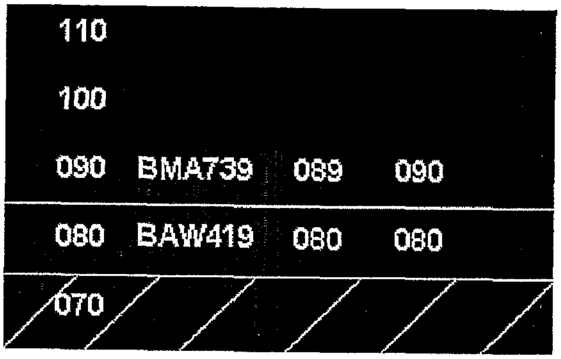
Figure 7C:
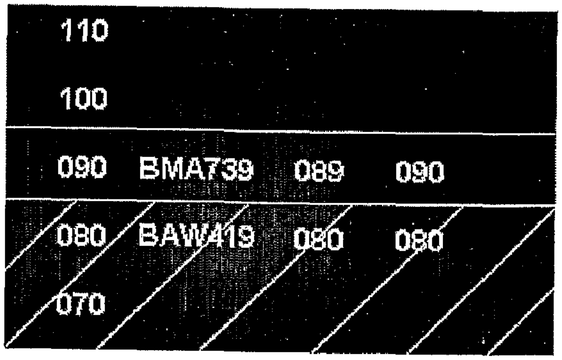

FIG. 7*a* shows the lower part of a display corresponding to that of FIG. 4 with air pressure and QNH at a first value;

FIG. 7*b* corresponds to FIG. 7*a* but with air pressure and QNH at a second, lower, value; and FIG. 7*c* corresponds to FIG. 7*a* but with air pressure and QNH at a third, yet lower, value.

GENERAL DESCRIPTION OF AIR TRAFFIC CONTROL SYSTEM

Figure 1:
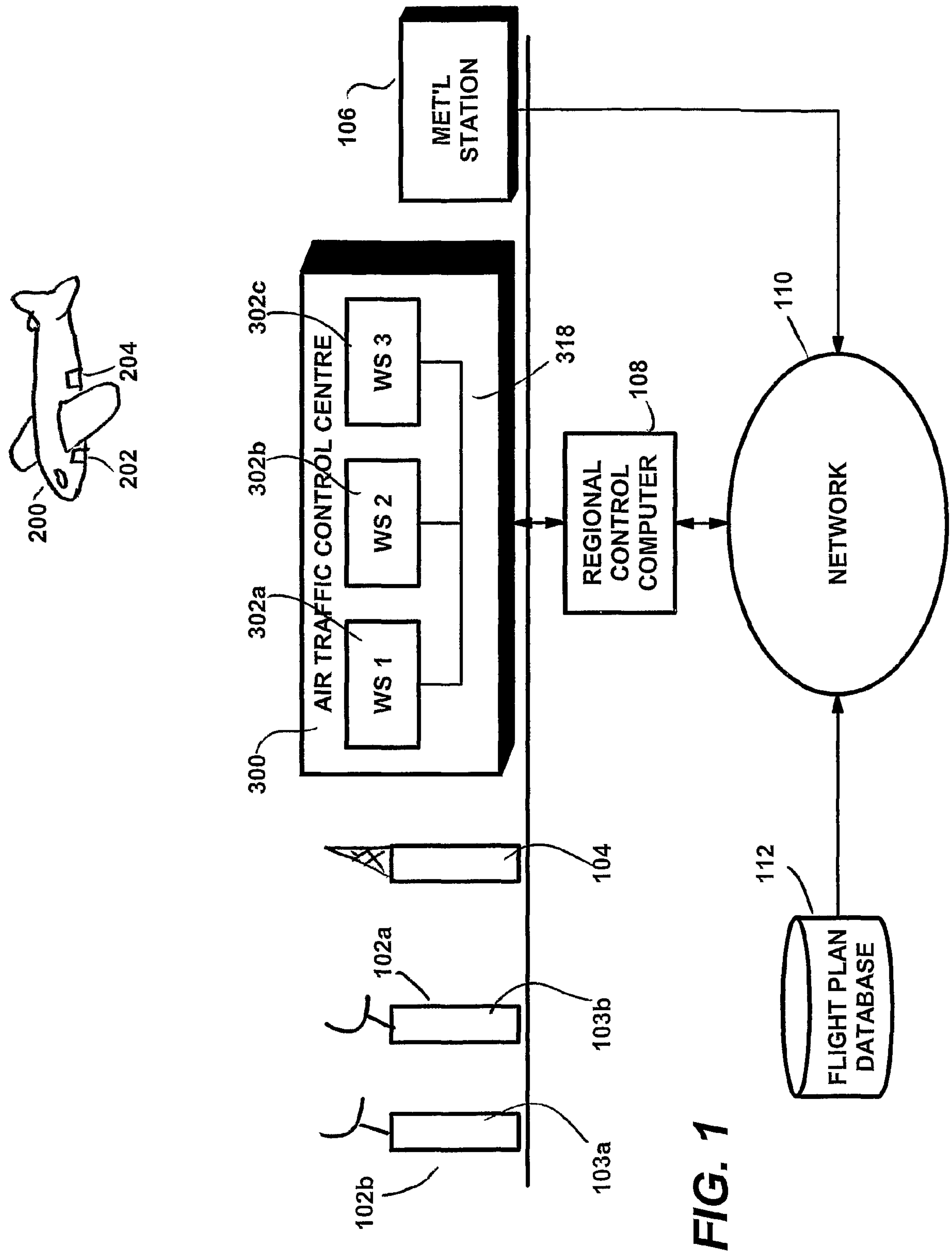
FIG. 1 is a block diagram showing an air traffic control system for a sector of airspace in accordance with an embodiment of the invention.

FIG. 1 shows the hardware elements of an air traffic control system (known per se, and used in the present embodiments). In FIG. 1, a radar tracking system, denoted 102, comprises radar equipment for tracking incoming aircraft, detecting bearing and range (primary radar) and altitude (secondary radar), and generating output signals indicating the position of each, at periodic intervals. It comprises first and second radar stations 102*a*, 102*b* each also equipped with a respective interrogator 103*a*, 103*b* for interrogating aircraft for Mode S data.

A radio communications station 104 is provided for voice communications with the cockpit radio of each aircraft 200. Each aircraft comprises a barometric altimeter 202 and a Mode S transponder 204 connected thereto and arranged to downlink altitude data therefrom.

A meteorological station 106 is provided for collecting meteorological data including local air pressure and outputting pressure measurements (and forecasts of wind, speed and direction, and other meteorological information). A server computer 108 communicating with a communication network 110 collects data from the radar system 102 and (via the network 110) the meteorological station 106, and provides the collected data to an air traffic control centre 300. Data from the air traffic control centre 300 is, likewise, returned to the server computer for distribution through the network 110 to air traffic control systems in other areas.

A database 112 stores respective records for each of a plurality of aircraft 200, including the aircraft callsign and flight plan.

The airspace for which the air traffic control centre 300 is responsible is typically divided into a plurality of sectors, each with defined geographical and vertical limits and controlled by planning and tactical controllers, and at least one controller is responsible for at least one vertical stack of aircraft.

The air traffic control centre 300 comprises a plurality of workstations for controllers 302*a*, 302*b*, . . . . Each controller receives flight plan data regarding the aircraft located in (and scheduled to enter) his sector from the database 112. Amongst other tasks, the controller is arranged to manage a vertical stack of aircraft 200*a*, 200*b*, . . . .

Figure 2:
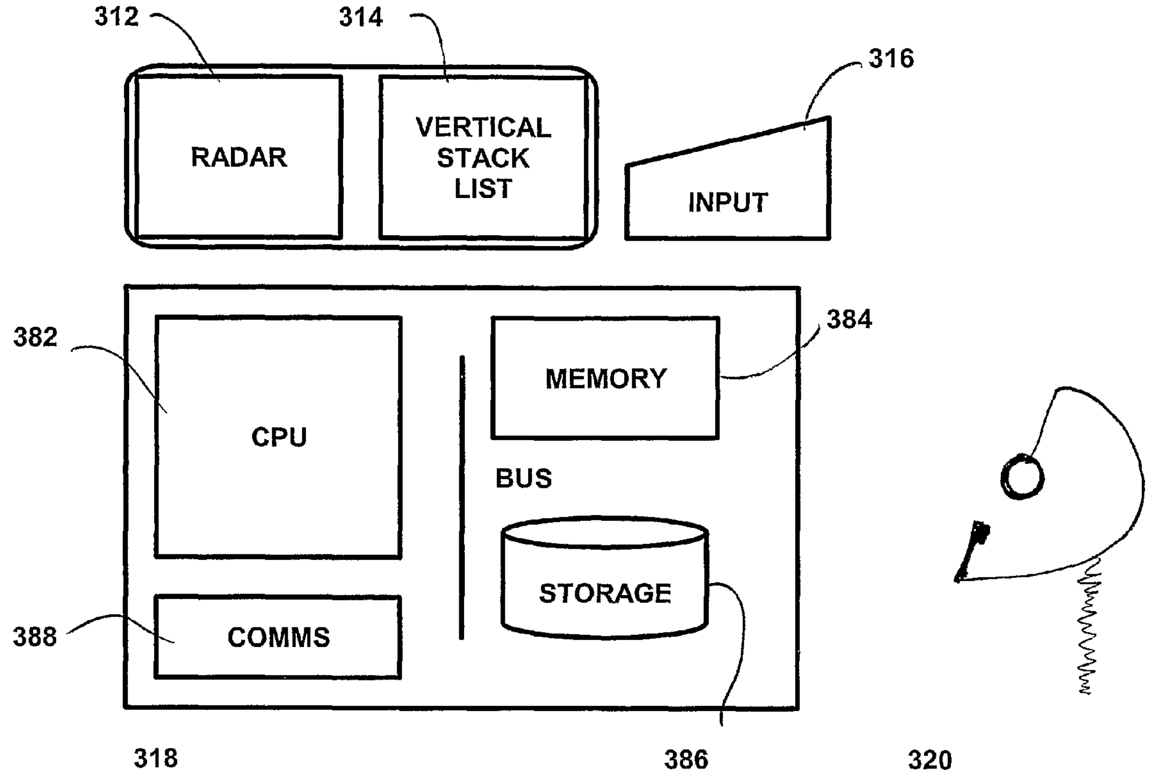
FIG. 2 is a block diagram showing the elements of a workstation forming part of FIG. 1.

Referring to FIG. 2, each workstation 38 comprises a CPU 382, memory 384, storage (e.g. a disc hard array) 386 and a communications interface 388. A local area network 308 interconnects all the workstation computers 318 with the server computer 108.

Figure 3:
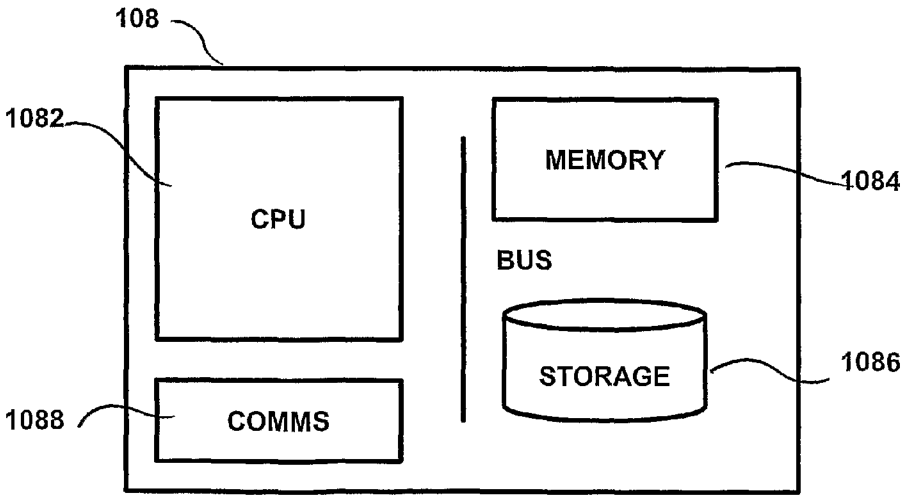
FIG. 3 is a block diagram showing the elements of a central computer forming part of FIG. 1.

Referring to FIG. 3, the server computer 108 comprises a CPU 1082, memory 1084, storage (e.g. a disc hard array) 1086 and a communications interface 1088. The server computer distributes data to the terminal workstation computers 318, and accepts data from them entered via the keyboard 316.

Referring to FIG. 2, each workstation 302 comprises a radar display screen 312 which shows a conventional plan (e.g. radar-type) view of the air sector, with the sector boundaries, the outline of geographical features such as coastline, the position and surrounding airspace of any airfields. Superimposed is a dynamic display of the position of each aircraft received from the radar system 102, together with the call sign or flight number (an alphanumeric indicator) of that aircraft. The tactical controller is therefore aware, at any moment, of the position of the aircraft in the sector. A headset 320 comprising an ear piece and microphone is connected with the radio station 104 to allow the controller to communicate with each aircraft 200.

A visual display unit 314 is also provided, on which a computer workstation 318 can cause the display of one or more of a plurality of different display formats, under control of the controller operating the keyboard 316 (which comprises a standard QWERTY keyboard and pointing device).

DESCRIPTION OF THE PREFERRED EMBODIMENTS

Referring to FIG. 4, one particular display shown on the screen 314 is shown. It comprises a vertical stack list of aircraft held in the stack by the controller operating the workstation. The list comprises a plurality of vertically-arranged horizontal slots 3142*a*, 3142*b* . . . . Each slot is centred at a respective flight level and has a vertical extent representing 1000 feet. It is intended that each be occupied by a single aircraft so that aircraft are separated by at least 1000 feet in altitude.

Each slot contains five display fields which are, from left to right;

Vertical Stack List level field indicating the flight level (in white numerals);

Aircraft call sign of any aircraft in that slot;

Pressure altitude of aircraft (i.e. its barometric altitude, relative to its reference pressure, reported in response to interrogation by the Mode S radar);

Ascending/descending arrow to indicate movement of the aircraft based on its current climb or descent;

Selected Flight Level field indicating the next flight level programmed into the autopilot by the aircrew.

The weather station 106 periodically measures the air pressure and the radar stations 102*a*, 102*b* periodically (e.g. of the order of every 10 seconds, for example every 4 seconds) interrogate each aircraft 200. Thus, the update frequency for each aircraft is higher than the update rate of each individual radar station, depending on the number of radar stations.

Figure 5:
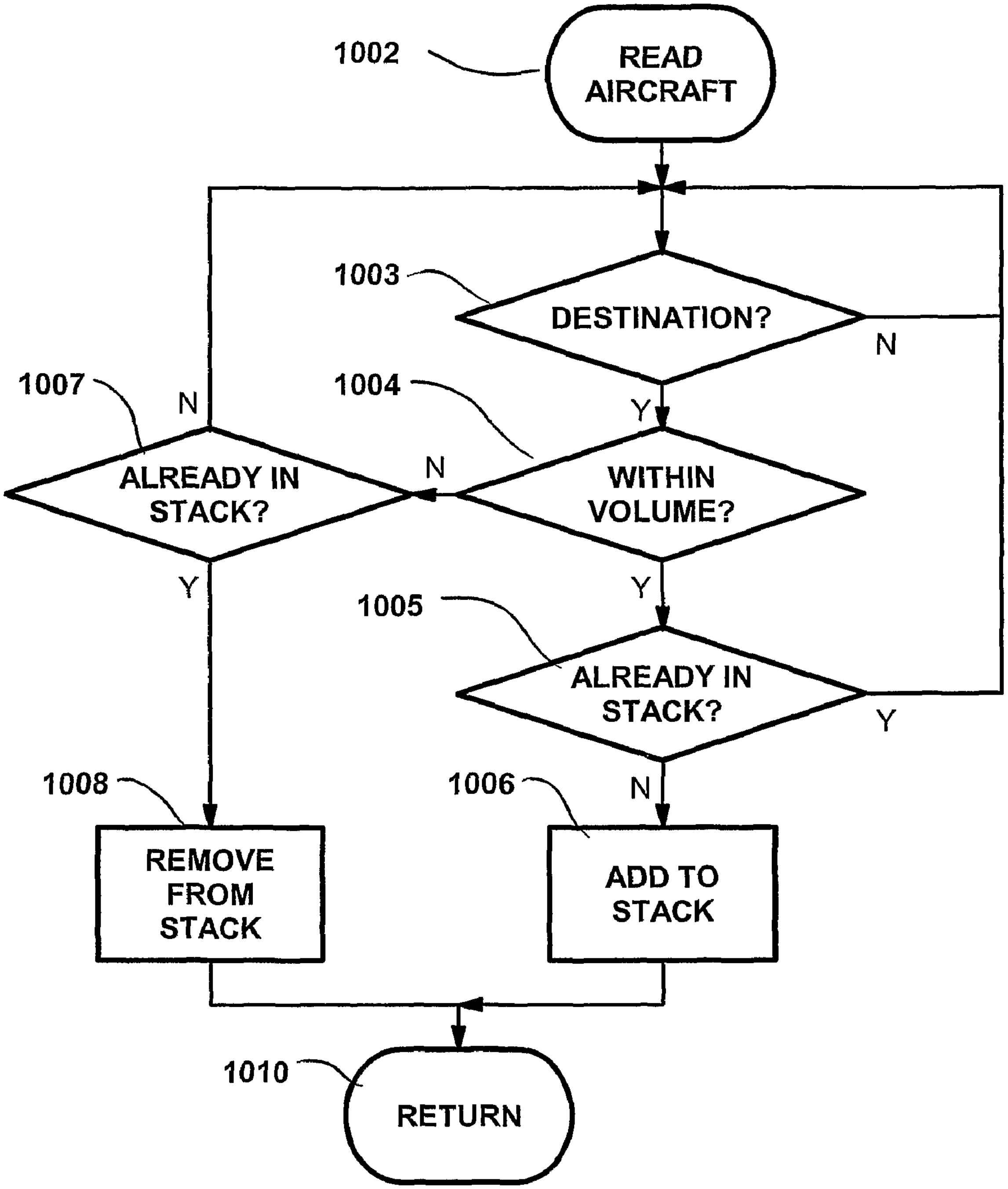
FIG. 5 is a flow diagram showing the process of automatically populating a stack list, performed by the preferred embodiment to produce the display of FIG. 4.

Referring to FIG. 5, in this embodiment, the stack list display is created and periodically updated. In step 1002, each detected aircraft is checked and in step 1004 its destination (stored in the database 112) is tested. In step 1003 the position of the aircraft is tested and, for those falling within a defined airspace volume (step 1004), and for which a record is not already held in a stack list record held in the computer 108 (step 1005), a record is created and added to the list (step 1006). The defined volume may for example be defined, in azimuth, by a 15 nautical mile radius from a predetermined stack reference point, and by upper and lower stack levels.

Aircraft falling within the defined volume are thus added to the stack list automatically when they enter the predefined volume. Aircraft may also be added to the stack list manually by the controller operating a workstation 302 by actuating an "ADD" button (shown in FIG. 4) and selecting an aircraft to add from the plan display or typing in its callsign. Each record thus added includes a flag field indicating its type (i.e. whether it was automatically or manually added).

If (step 1004) the aircraft is not inside the defined volume, then (step 1007), the records of aircraft currently in the stack are examined and any which have thus been detected as having left the predefined volume, and for which the flag type is "automatic", have their records deleted from the stack record in step 1008. Those for which the flag type is "manual" can be manually removed by the controller.

In step 1012, a new altitude ("current flight level") of an aircraft is read via a radar station, and passed to the computer 108. In step 1013, the computer 108 is arranged to examine all aircraft records in the stack and sort them in order of altitude. In step 1014, the workstation 302 accesses the stack list and displays the vertical stack list. The aircraft (indicated by their respective call signs) are displayed within their slots showing their current flight levels. Where a slot contains more than one aircraft, they are presented in vertical order, the higher aircraft entry being displayed higher in the slot.

Figure 6A:
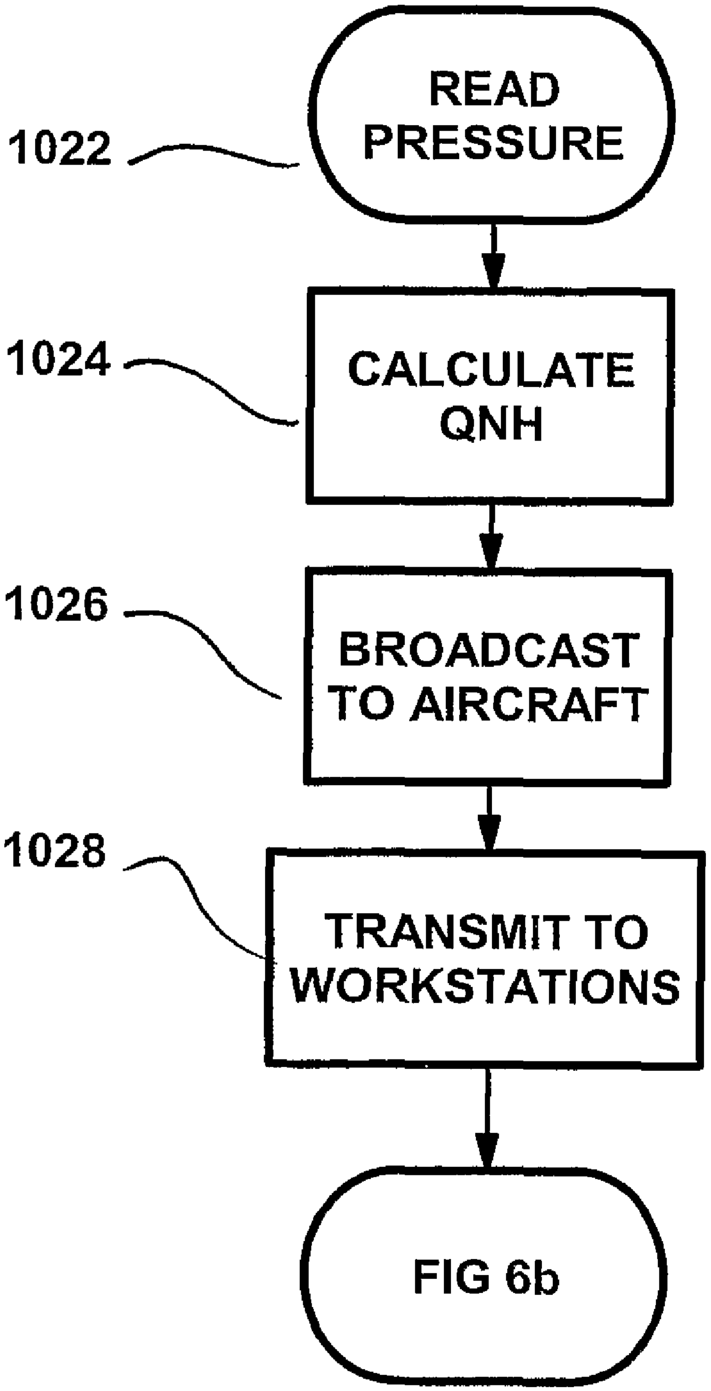
FIG. 6 is a flow diagram showing a process performed by a preferred embodiment in regenerating the display of FIG. 4 depending on pressure measurements.
Figure 6B:
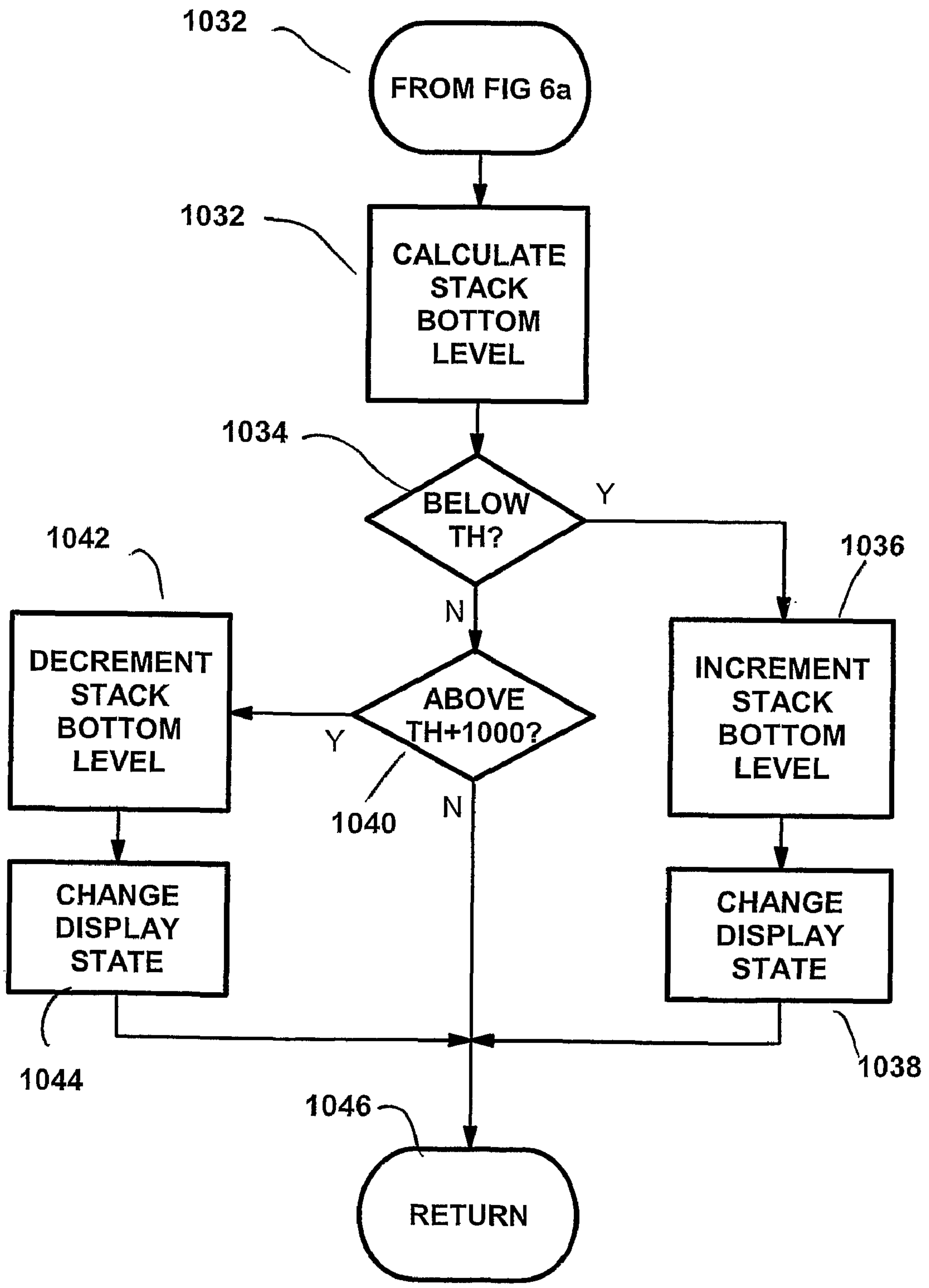

Referring to FIG. 6, each time the pressure measured at the weather station changes, a new pressure measurement is transmitted to the server computer 108 in step 1022, which calculates therefrom the QNH taking into account the altitude of the weather station (at which the pressure was measured), and the altitude of the airfield at which the stack is located, in step 1024. The QNH measurement is then broadcast as a voice broadcast from the transmission station 104 in step 1026, for the benefit of all aircraft in the sector. The QNH is also transmitted to each workstation 302 in step 1028.

At the workstation, the lowest flight level used in the stack is now tested in the light of the new QNH, to maintain the bottom of the stack at least 1000 feet above the transition altitude. Around London airports, the transition altitude is 6000 feet above the ground (defined using the QNH as the reference pressure). If the QNH happens to be 1013 mBar then flight level 070 corresponds to 7000 feet above ground level, and as this level is 1000 feet above the transition altitude it can be used as the bottom of the stack, as is shown in FIG. 7*a*. On the other hand, if the local pressure were to fall so that the QNH lies below 1013 mBar, then flight level 070 (together with all other flight levels) descends so that it is no longer at 7000 feet above ground level and hence no longer 1000 feet above the transition altitude.

Accordingly, in step 1032, the workstation calculates the altitude of the lowest flight level in the stack, and in step 1034 tests whether it lies below a threshold TH consisting of the transition altitude plus 1000 feet (i.e. in London, TH=7000 ft). If so, (i.e. if the bottom of the stack has fallen too far towards the transition altitude), then in step 1036 a new stack bottom level consisting of the previous level plus 1000 feet is selected, and in step 1038 the state of the previous level is changed, as shown in FIG. 7*b*, to show the previous stack bottom slot as unavailable by hatching. The workstation then returns to step 1032 to check that the new stack bottom level is satisfactory.

Should the pressure be such that flight level 080 is lower than 7000 feet above ground level, then flight level 090 would be set at the bottom of the stack as shown in FIG. 7*c*.

Where the current stack was above the threshold in step 1034, then in step 1040 the controller tests whether the bottom of the stack was above 1000 feet above the threshold and, if so (in other words if there is space above the transition altitude to insert another slot), in step 1042 the level of the bottom of the stack is reduced by 1000 feet and in step 1044 the display of the previously closed slot thus opened is changed to remove the hatching therefrom. The workstation then returns to step 1032 to check that the new stack bottom level is satisfactory.

In another area (not shown) of the display 314, after each QNH change the new QNH value is displayed and flashes, to draw the attention of the controller who is able to note immediately the changing situation, and immediately grasp the new dimensions of the stack. The controller can respond by either moving aircraft down into newly available unoccupied levels to maximise use of the crowded airspace (if new levels become available), or moving them up from levels now too low to safely avoid the transition altitude as soon as possible.

Thus, the present embodiment as described above allows the controller quickly and safely to control the aircraft in a stack to maintain their safe separation above levels at which aircraft are taking off and landing whilst maximising use of airspace and throughput, by automatically calculating and displaying safe lowest stack levels and updating those displays in real time with pressure changes.

The lowest slot of the stack may not be controlled by the same controller as the rest. For example, it may be controlled by a controller handling a takeoff, or a transit through to another nearby airfield. In one preferred embodiment, as shown in FIGS. 4 and 7*a*-7*c*, the lowest slot in the stack is shown in a visually distinctive fashion—for example, it may be separated from levels above by a thick horizontal line as shown. When the display state is changed in steps 1036 or 1044 in this embodiment, the position of the horizontal line is moved either up a slot or down a slot as the stack bottom moves up or down. The stack controller is therefore able to avoid use of this lowest level slot.

Other Variants and Embodiments

Although embodiments of the invention have been described above, it will be clear that many other modifications and variations could be employed without departing from the invention.

Whilst calculations and comparisons based on altitude are described, it will be apparent that these could be replaced by calculations and comparisons based on pressure. Whilst particular units, dimensions, spacings and measurement systems are described, which are appropriate to present-day Heathrow airport, these could easily be changed to others appropriate to other airports and control regimes.

Whilst the workstations are described as performing the human machine interface and receiving and transmitting data to the host computer, "dumb" terminals could be provided (all calculation being performed at the host). In general, calculations can be performed either at distributed terminals or at a central computer, although the described embodiment is found to provide a suitable load balance given present-day equipment. Many other modifications will be apparent to the skilled person, and the present invention extends to any and all such modifications and embodiments.

The present invention is useable with the features of our co-pending PCT application, PCT/GB2007/002459, filed on the same day as the present application, claiming priority from UK patent application GB0613054.6, agents' reference J00048915WO.

The invention claimed is:

1. An air traffic control system, for use by a human controller controlling a plurality of aircraft held vertically separated in a stack above a minimum stack level, the system comprising:

- a display device for the human controller; and
- one or more processors controlling said display device and configured to
  - periodically receive a value representative of local terrestrial air pressure conditions,
  - periodically receive an aircraft flight level reading representing an altitude defined by a reference air pressure measured on the aircraft,
  - periodically generate a display on said display device comprising a plurality of flight levels vertically arranged;
  - indicate in said display said plurality of aircraft, arranged in a vertical list ranked by flight level; and
  - on reception of a new said value, re-determine said minimum stack level and to vary said display so as to indicate changes to said minimum stack level.

2. A system according to claim 1 in which said plurality of flight levels displayed are displayed as a plurality of slots each for accommodating an aircraft separated from its neighbours by a minimum height spacing.

3. A system according to claim 2 in which said slots define a height spacing of 1000 feet.

4. A system according to claim 2 in which at least one lowest said slot above said minimum level is represented visually differently to other said slots on said display.

5. A system according to claim 4 in which said at least one lowest slot is represented visually differently by being separated from those above it, by displaying a horizontal line therebetween.

6. A system according to claim 1 in which said processor is arranged to vary said minimum stack level so as to maintain it above a transition altitude at which aircraft change between altitude measurements determined in accordance with local air pressure data and flight levels determined in accordance with said reference air pressure.

7. A system according to claim 6 in which said processor is arranged to maintain said minimum stack level at least 1000 feet above said transition altitude.

8. A system according to claim 1 further comprising at least one radar station equipped with a transponder for interrogating each said aircraft for its flight level to provide said flight level readings.

9. A system according to claim 1 further comprising at least one terrestrial barometer arranged periodically to generate said value.

10. A method for operating an air traffic control system used by a human controller controlling a plurality of aircraft held vertically separated in a stack above a minimum stack level, the air traffic control system including a display device for the human controller and one or more processors controlling the display device, the method comprising:

- receiving a value representative of local terrestrial air pressure conditions;
- receiving an aircraft flight level reading representing an altitude defined by a reference air pressure measured on the aircraft;
- generating a display on said display device comprising a plurality of flight levels vertically arranged;
- indicating in said display said plurality of aircraft, arranged in a vertical list ranked by flight level; and
- on reception of a new said value, re-determining said minimum stack level and to vary said display so as to indicate changes to said minimum stack level.

11. A method according to claim 10 in which said plurality of flight levels displayed are displayed as a plurality of slots each for accommodating an aircraft separated from its neighbors by a minimum height spacing.

12. A method according to claim 11 in which said slots define a height spacing of 1000 feet.

13. A method according to claim 11 in which at least one lowest said slot above said minimum level is represented visually differently to other said slots on said display.

14. A method according to claim 13 in which said at least one lowest slot is represented visually differently by being separated from those above it, by displaying a horizontal line there between.

15. A method according to claim 10 further comprising varying said minimum stack level so as to maintain said minimum stack level above a transition altitude at which aircraft change between altitude measurements determined in accordance with local air pressure data and flight levels determined in accordance with said reference air pressure.

16. A method according to claim 15 further comprising maintaining said minimum stack level at least 1000 feet above said transition altitude.

* * * * *